US007772451B2

(12) United States Patent
Enda et al.

(10) Patent No.: US 7,772,451 B2
(45) **Date of Patent: *Aug. 10, 2010**

(54) SYSTEM AND METHOD FOR CHEMICAL DECONTAMINATION OF RADIOACTIVE MATERIAL

(75) Inventors: Masami Enda, Kanagawa-ken (JP); Yumi Yaita, Tokyo (JP); Mitsuyoshi Sato, Kanagawa-ken (JP); Hitoshi Sakai, Kanagawa-ken (JP); Takeshi Kanasaki, Kanagawa-ken (JP); Ichiro Inami, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 270 days.

This patent is subject to a terminal disclaimer.

(21) Appl. No.: 11/443,106

(22) Filed: May 31, 2006

(65) Prior Publication Data

US 2010/0154840 A1 Jun. 24, 2010

Related U.S. Application Data

(62) Division of application No. 10/717,628, filed on Nov. 21, 2003, now Pat. No. 7,087,120.

(30) Foreign Application Priority Data

Nov. 21, 2002 (JP) ............................ 2002-337339
Mar. 19, 2003 (JP) ............................ 2003-075932

(51) Int. Cl.
*A62D 3/37* (2006.01)
*C02F 1/42* (2006.01)

(52) U.S. Cl. ...................................... 588/319; 210/688

(58) Field of Classification Search ................. 588/319, 588/320
See application file for complete search history.

(56) References Cited

U.S. PATENT DOCUMENTS

| | | | | | |
|---|---|---|---|---|---|
| 3,873,362 | A | * | 3/1975 | Mihram et al. | 134/3 |
| 4,217,192 | A | | 8/1980 | Lerch et al. | |
| 4,226,640 | A | * | 10/1980 | Bertholdt | 134/3 |
| 4,287,002 | A | | 9/1981 | Torok | |
| 4,508,641 | A | * | 4/1985 | Hanulik | 588/3 |
| 4,587,043 | A | * | 5/1986 | Murray et al. | 376/310 |
| 4,756,768 | A | | 7/1988 | Bertholdt et al. | |
| 4,942,594 | A | * | 7/1990 | Bertholdt et al. | 376/310 |
| 5,640,703 | A | | 6/1997 | Brierley et al. | |
| 5,752,206 | A | | 5/1998 | Frink et al. | |
| 5,814,204 | A | * | 9/1998 | D'Muhala | 205/705 |
| 5,958,247 | A | * | 9/1999 | Bertholdt et al. | 210/668 |

FOREIGN PATENT DOCUMENTS

| | | |
|---|---|---|
| DE | 44 10 747 | 10/1995 |
| EP | 0 533 494 | 3/1993 |

(Continued)

OTHER PUBLICATIONS

U.S. Appl. No. 11/444,424, filed Jun. 1, 2006, Enda, et al.

(Continued)

*Primary Examiner*—Melvin C Mayes
*Assistant Examiner*—Kenneth Vaden
(74) *Attorney, Agent, or Firm*—Oblon, Spivak, McClelland, Maier & Neustadt, L.L.P.

(57) ABSTRACT

A system for chemically decontaminating radioactive material.

16 Claims, 6 Drawing Sheets

FOREIGN PATENT DOCUMENTS

| | | |
|---|---|---|
| JP | 5-209997 | 8/1993 |
| JP | 7-140296 | 6/1995 |
| JP | 9-159798 | 6/1997 |
| JP | 9-510784 | 10/1997 |
| JP | 2000-81498 | 3/2000 |
| JP | 2002-250794 | 9/2002 |

OTHER PUBLICATIONS

U.S. Appl. No. 12/278,864, filed Aug. 8, 2008, Enda, et al.

* cited by examiner

SYSTEM AND METHOD FOR CHEMICAL DECONTAMINATION OF RADIOACTIVE MATERIAL

CROSS-REFERENCE TO RELATED APPLICATIONS

This application is a divisional application of, and claims priority to U.S. application Ser. No. 10/717,628 filed Nov. 21, 2003, now issued as U.S. Pat. No. 7,087,120. The entire contents of U.S. application Ser. No. 10/717,628 are incorporated herein by reference.

BACKGROUND OF THE INVENTION

This invention is related generally to a system and a method for chemical decontamination of radioactive material, and more particularly to a system and a method for chemically dissolving oxide film on a surface of a contaminated component or the base material of the component.

In a facility handling nuclear radiation, oxide film containing radioactive nuclides is adhered or generated on the internal surface of the constructional parts in contact with fluid containing radioactive material as the operation is continued. When the operational experience time becomes longer, the radiation level around the constructional parts such as piping and components becomes higher, the dosage the personnel would receive during periodic inspection or during demolishing in decommissioning of the facility would be increased. Practical chemical decontamination technique, by which the oxide film is chemically dissolved and removed has been developed to reduce dosage of personnel.

Various chemical decontamination methods have been proposed. For example, a method is known which has a step of oxidizing and dissolving the chromium oxide in the oxide film with oxidizer agent and a step of reducing and dissolving the iron oxide which is a main component of the oxide film by reduction agent.

Japanese Patent Publication (Tokkou) Hei-3-10919 discloses a chemical decontamination method where dicalboxylic acid (oxalic acid) aqueous solution is used as a reducer. According to this method, permanganic acid and oxalic acid are used. Permanganic acid has a strong oxidation effect with low concentration, and oxalic acid can be decomposed into carbon dioxide and water. Therefore, the amount of secondary waste material generation is reduced compared to the conventional chemical decontamination method. This method has been actually used in a decontamination work of a nuclear power facility.

Japanese Patent Application Publication (Tokkai) 2000-81498 discloses a chemical decontamination method where ozone aqueous solution is used as an oxidizer and oxalic acid'aqueous solution is used as a reducer. Ozone is decomposed into oxygen, and oxalic acid is decomposed into carbon dioxide and water. Therefore, this method is noted as a decontamination technique which can reduce secondary waste material.

Japanese Patent Application Publication (Tokkai) Hei-9-113690 discloses a method for decontaminating stainless steel waste material in organic acid (oxalic acid or formic acid) aqueous solution. According to this method, a stainless steel component is set in contact with a metal component which has a lower potential than oxidation-reduction potential of stainless steel, and the base material of stainless steel is dissolved and decontaminated. Since a single organic acid aqueous solution process is used, the decontamination process is simple. In addition, since the base metal is dissolved, this method is effective as a method for decontaminating waste metal to a general industrial waste level of radioactivity.

Japanese International Patent Application Publication (Tokuhyou) Hei-9-510784 (International Patent Application Publication WO 95/26555) discloses treatment of oxalic acid aqueous solution as a treatment of decontamination waste liquid.

According to this reference, $Fe^{3+}$ in the oxalic acid aqueous solution forms anions as a complex with oxalic acid. $Fe^{3+}$ is reduced into $Fe^{2+}$ by irradiation of ray (hν), as shown in Equation (1) shown below:

$$[Fe(C_2O_4)_3]^{3-}+h\nu \rightarrow FeII(C_2O_4)_2+2CO_2 \quad (1)$$

Then, $Fe^{2+}$ in the oxalic acid aqueous solution can be separated by cation resins. Oxalic acid is decomposed by the oxidation effect of hydroxy radical or OH(radical), which is generated as a result of a reaction of hydrogen peroxide ($H_2O_2$) and $Fe^{2+}$, and carbon dioxide and water are generated as shown in Equations (2) and (3) shown below:

$$H_2O_2+Fe^{2+} \rightarrow Fe^{3+}+OH^-+OH(\text{radical}) \quad (2)$$

$$H_2C_2O_4+2OH(\text{radical}) \rightarrow 2CO_2+2H_2O \quad (3)$$

The techniques disclosed in the references cited above can be used as decontamination techniques for reducing dosage of personnel working for periodic inspection of nuclear facilities such as nuclear power plants. However, ultraviolet ray devices are required to reduce $Fe^{3+}$ into $Fe^{2+}$ when oxalic acid is used as a reducer. As the structure to be decontaminated becomes larger, the amount of the decontamination liquid increases, and the required ultraviolet ray device becomes larger, which results in enhanced cost for the device construction. In addition, required time period for dissolving oxalic acid becomes longer which results in longer decontamination work time period.

In the technique disclosed in Japanese Patent Application Publication Hei-9-113690, formic acid is utilized as a decontamination agent. However, formic acid cannot be used in decontamination if the component to be decontaminated has to be in safe, because formic acid electro-chemically dissolves the base metal. Furthermore, simple treatment with only formic acid cannot dissolve and remove oxide film and iron oxide which have been generated on the surface of the components, and sufficient decontamination performance cannot be obtained.

Japanese Patent Application Publication (Tokkai) Hei-2-222597 and Japanese International Patent Application Publication (Tokuhyou) 2002-513163 (International Patent Application Publication WO 99/56286) disclose chemical decontamination techniques for radioactive metal waste. Japanese Patent Application Publication Hei-2-222597 discloses a method where the component to be decontaminated is temporally electrolyzed and reduced in sulfuric acid aqueous solution, and the potential is lowered to corrosion region of stainless steel so that the base metal would be dissolved and decontaminated.

Japanese International Patent Application Publication 2002-513163 cited above discloses a method of decontamination, where trivalent irons are reduced into bivalent irons by ultraviolet ray, and oxidation-reduction potential of organic acid aqueous solution is lowered to corrosion region of stainless steel so that the base metal would be dissolved and decontaminated. This reference also discloses a method for removing iron ions in organic acid aqueous solution by cation exchange resins. Since trivalent irons are in form of complexes with organic acid as complex anions, they cannot be removed by cation exchange resins. Therefore, trivalent irons are reduced into bivalent irons by irradiation of ultraviolet ray. Bivalent irons can be easily removed by cation exchange resins since bivalent iron oxalate complex would be less stable.

According to the technique disclosed in Japanese Patent Application Publication Hei-2-222597 cited above, oxidation-reduction potential is enhanced when concentrations of iron ions and chromium ions dissolved in the decontamination liquid increase. Therefore, dissolving reaction of stainless steel ceases, and the decontamination performance would deteriorate. Since sulfuric acid is used as a decontamination agent, the decontamination waste liquid generated in the decontamination process cannot be accepted in the existing waste liquid process system of nuclear facility without modification. A dedicated neutralization treatment device and an aggregation/settling tank are required. The aggregation/settling tank is to be used for separating deposition, which is separated out as hydroxide, and clear supernatant liquid, which would result in higher cost for construction of the decontamination system. Furthermore, large amount of secondary waste material is generated in the neutralization process, and cost for disposing the waste material increases.

According to the technique disclosed in Japanese International Patent Application Publication 2002-513163 cited above, the decontamination device itself in contact with the decontamination liquid would be corroded, since the potential is lowered by concentration control of the bivalent and trivalent irons in organic acid decontamination liquid. Especially, oxalic acid has larger corrosion rate compared to other organic acids. Therefore, the decontamination device made from stainless steel may have a failure due to corrosion. In addition, the metal removed by the ion exchange resins includes metal which has eluted from the decontamination device, so that another problem may be generated in increase of spent ion exchange resins.

The present inventors have obtained new information by actually decontaminating components contaminated with radioactivity, using the technology disclosed in Japanese Patent Application Publication Hei-9-113690 cited above. The newly obtained information includes:

(1) In a case of using organic acid as decontamination liquid, if only oxalic acid is used, decontamination performance is high because it reduces and dissolves iron oxide. However, it takes long time to decompose the oxalic acid. If only formic acid is used, it takes shorter time to decompose the formic acid compared with the oxalic acid. However, the decontamination performance is not high because formic acid would not dissolve iron oxide.

(2) Similarly to the technology disclosed in Japanese Patent Application Publication Hei-2-222597 cited above, in a case of temporary potential control, oxidation-reduction potential of the decontamination liquid is enhanced, as the concentrations of iron ions and chromium ions dissolved in the decontamination liquid increase. Therefore, dissolving reaction of stainless steel ceases, and decontamination performance deteriorates.

(3) When oxide film including chromium oxide film is generated or adhered on the surface of the component, decontamination performance can be enhanced by oxidizing-dissolving the chromium with oxidizer agent.

The entire contents of the all references cited above are incorporated herein by reference.

BRIEF SUMMARY OF THE INVENTION

Accordingly, it is an object of the present invention to provide an improved system or method for chemical decontamination of radioactive material. The system or the method do not require a step or a device for reducing trivalent iron ions into bivalent iron ions, the dissolving rate is higher than those using oxalic acid, and have a decontamination performance equivalent to oxalic acid.

It is another object of the present invention to provide an improved system or method for chemical decontamination of radioactive material, wherein the decontamination rate is high, corrosion of the decontamination device is evaded and amount of generated secondary waste is comparatively small.

There has been provided, in accordance with an aspect of the present invention, a method for chemically decontaminating radioactive material, the method comprising: reducing-dissolving step for setting surface of radioactive material in contact with reducing decontamination liquid including mono-carboxylic acid and di-carboxylic acid as dissolvent; and oxidizing-dissolving step for setting the surface of the radioactive material in contact with oxidizing decontamination liquid including oxidizer.

There has also been provided, in accordance with another aspect of the present invention, a system for chemically decontaminating radioactive material which forms a passage for liquid to flow through, the system comprising: a circulation loop connected to the passage for circulating the decontamination liquid, the circulation loop having: a decontamination agent feeder for feeding mono-carboxylic acid and di-carboxylic to the decontamination liquid; a hydrogen peroxide feeder for feeding hydrogen peroxide to the decontamination liquid; an ion exchanger for separating and removing metal ions in the decontamination liquid; and an ozonizer for injecting ozone into the decontamination liquid.

There has also been provided, in accordance with another aspect of the present invention, a system for chemically decontaminating radioactive material, the system comprising: a decontamination tank for containing radioactive material and decontamination liquid; a direct current power source for providing potential between the radioactive material and an anode; and a circulation loop connected to the tank for circulating the decontamination liquid, the circulation loop having: a decontamination agent feeder for feeding mono-carboxylic acid and di-carboxylic acid into the decontamination liquid; a hydrogen peroxide feeder for feeding hydrogen peroxide into the decontamination liquid; an ion exchanger for separating and removing metal ions in the decontamination liquid; and an ozonizer for injecting ozone into the decontamination liquid.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION OF THE INVENTION

First Embodiment

A first embodiment of a method and a system for chemically decontaminating radioactive material according to the present invention are now described with reference to FIGS. 1 through 4. In this embodiment, the oxide layer (or film) on the surface of the radioactive component is dissolved, but the base metal of the radioactive component is not dissolved and remain intact.

Figure 1:
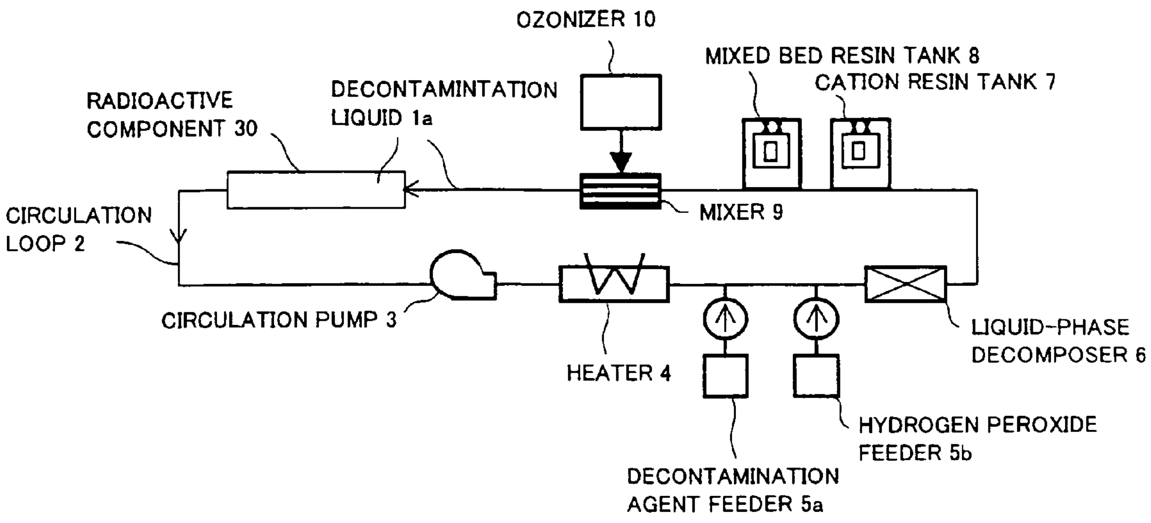
FIG. 1 is a flow diagram showing a first embodiment of a system for chemical decontamination of radioactive material according to the present invention.

FIG. 1 shows a first embodiment of a system used for chemically decontaminating radioactive material according to the present invention. The system is used for chemically decontaminating radioactive component (or contaminated component) 30 such as a pipe section which has a passage for decontamination liquid 1*a* to pass through. The system includes a circulation loop 2 which is connected to the radioactive component 30 to be decontaminated for circulating the decontamination liquid 1*a*. The circulation loop 2 includes a circulation pump 3, a heater 4, a decontamination agent feeder 5*a*, a hydrogen peroxide feeder 5*b*, a liquid-phase decomposer 6, a cation resin tank 7, a mixed bed resin tank 8, a mixer 9 and an ozonizer 10. The mixed bed resin tank 8 is filled with mixture of cation resins and anion resins.

The decontamination liquid 1*a* is driven by the circulation pump 3 through the circulation loop 2 and the radioactive component 30.

When the oxide film on the surface of the radioactive component 30 is reduced and dissolved, reducing aqueous solution mixture including formic acid and oxalic acid is fed to the circulation loop 2 through the decontamination agent feeder 5*a*. The iron ions dissolved into the reducing decontamination liquid is separated and removed by the cation resin tank 7.

After the reducing-decontaminating step, the reducing decontamination liquid is decomposed into carbon dioxide and water. The decomposition is conducted either by injecting ozone gas from the ozonizer 10 to the circulation loop 2 via the mixer 9, or by feeding hydrogen peroxide from the hydrogen peroxide feeder 5*b*. The metal ions dissolved in the decontamination liquid 1*a* are removed by the cation resin tank 7. If ozone or hydrogen peroxide is remained when the decontamination liquid 1*a* is passed through the cation resin tank 7, ultraviolet ray is irradiated at the liquid-phase decomposer 6. Thus, the ozone is decomposed into oxygen, and the hydrogen peroxide is dissolved into hydrogen and oxygen.

When the oxide film on the surface of the radioactive component 30 is oxidized and dissolved, ozone gas is injected from the ozonizer 10 to the mixer 9 to generate ozone water, and the ozone water is injected into the decontamination liquid 1*a* in the circulation loop 2.

The decontamination liquid remained in the system after the decontamination process is cleaned by passing through the mixed bed resin tank 8.

Although oxide film formed on stainless steel surface can be dissolved and removed with only formic acid accompanied by oxidation treatment, iron oxide can be hardly dissolved with only formic acid. In the present embodiment, oxalic acid is added to the formic acid in order to dissolve the iron oxide. The mole fraction of formic acid is 0.9 or more in the decontamination liquid of the mixture aqueous solution of formic acid and oxalic acid. Formic acid can be decomposed in a short time with only hydrogen peroxide, as described below. Besides, oxalic acid in low concentration can be decomposed in a short time with ozone, permanganic acid or potassium permanganate. Therefore, time for decontamination treatment can be drastically shortened.

Ozone, permanganic acid or permanganate (potassium permanganate, for example) can be used as an oxidizer for oxidizing the surface of the radioactive component. Using such oxidizer with formic acid can enhance dissolving-removing rate of the oxide film.

Since equilibrium constants of the complex forming reactions of ions of $Fe^{2+}$ and $Fe^{3+}$ with formic acid are small, both types of ions can be adsorbed and separated with cation resins. Therefore, a device for reducing $Fe^{3+}$ ions into $Fe^{2+}$ ions is not required which is required when oxalic acid is used.

Although formic acid can be decomposed with hydrogen peroxide in a short time, oxalic acid can hardly be decomposed with only hydrogen peroxide. The oxalic acid, which is remained after formic acid is decomposed, is decomposed with ozone, permanganic acid and potassium permanganate which are used in oxidation treatment. Since the mole fraction of oxalic acid is 0.1 or less, the oxalic acid can be decomposed in a short time.

Now, test results are explained confirming the oxide film dissolution performance of the chemical decontamination method of the first embodiment according to the present invention shown in FIG. 1. The oxide film dissolution tests were conducted with stainless steel (Japanese Industrial Standard SUS 304) test pieces covered with oxide films for 3,000 hours. The oxide films had been formed in water under a condition simulating water in the primary system in a boiling water nuclear power station.

Figure 2:
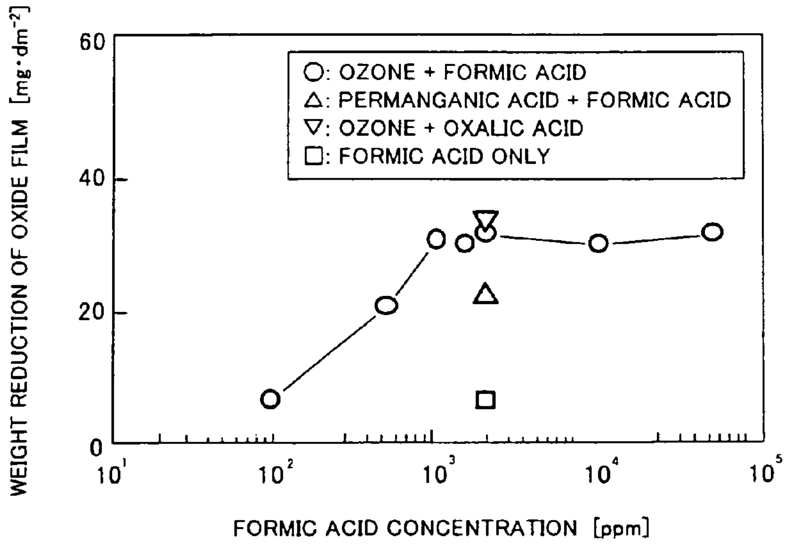
FIG. 2 is a curvature figure of oxide film dissolution for showing the effect of the first embodiment of the chemical decontamination method and system of radioactive material according to the present invention.

FIG. 2 shows the first test results. The ordinate axis represents weight reduction of the oxide films, while the abscissa axis represents formic acid concentration. The blank circles (○) represent the results obtained by treating with formic acid aqueous solution after treating with ozone aqueous solution. The blank triangles (Δ) represent the results obtained by treating with formic acid aqueous solution after treating with permanganic acid aqueous solution. The blank inverted triangles (∇) represent the results obtained by treating with oxalic acid aqueous solution after treating with ozone aqueous solution, as prior-art examples for comparison. The blank squares (□) represent the results obtained by treating with only formic acid aqueous solution, as other prior-art examples for comparison.

The ozone treatment was conducted under a condition of a concentration of 5 ppm, a temperature of 80 degrees Centigrade and a submerging time of 2 hours. The permanganic acid treatment was conducted under a condition of a concentration of 300 ppm, a temperature of 95 degrees Centigrade and submerging time of 2 hours. The formic acid treatment was conducted under a condition of a concentration of 100-50,000 ppm (2.2-110 m mol $L^{-1}$), a temperature of 95 degrees Centigrade and a submerging time of 1 hour. The oxalic acid treatment was conducted under a condition of a concentration of 2,000 ppm (22 m mol $L^{-1}$), a temperature of 95 degrees Centigrade and a submerging time of 1 hour.

The oxide film was hardly removed by only formic acid (a concentration of 2,000 ppm or 43 m mol $L^{-1}$) treatment as shown in the graph. On the other hand, in the process with both ozone treatment and formic acid treatment of this embodiment according to the present invention, the oxide was removed more by increased concentration of formic acid. The rate of removal was constant with 1,000 ppm (22 m mol $L^{-1}$) or more of the formic acid concentration. When the rate of dissolution of the cases with 1,000 ppm (22 m mol $L^{-1}$) or more of the formic acid are compared, the cases of the present embodiment had about 5 times of the dissolution of the case with only formic acid. The rate of dissolution was equivalent to the prior-art combination of ozone treatment and oxalic treatment.

Also in the combination of permanganic acid treatment and formic acid treatment of the present embodiment, oxide film removing effect was obtained. About 3 times of the removing rate of the case with only formic acid treatment was obtained, although the dissolution rate was smaller than the case using the ozone treatment. Furthermore, similar effect was obtained in a test where potassium permanganate was chosen as a permanganate. Treatment of potassium permanganate was conducted and subsequently formic acid treatment was conducted. In the treatment of potassium permanganate, the concentration was 300 ppm, the temperature was 95 degrees Centigrade and submergence duration time was an hour. In the formic acid treatment, the concentration was 2,000 ppm (43 m mol $L^{-1}$), the temperature was 95 degrees Centigrade and submergence was for an hour.

According to the present embodiment of the chemical decontamination method described above, ozone, permanganic acid or permanganate are used in oxidation treatment, and mixture of formic acid and oxalic acid is used as decontamination liquid in reduction treatment. Thus, oxide film generated on surface of stainless steel and iron oxide can be effectively removed or dissolved.

Since radioactive material is absorbed in the oxide film on the surface of radioactive component, radioactive material can be removed from the radioactive component by dissolving and removing the oxide film. Thus, radiation dosage of the working personnel can be reduced.

Only formic acid combined with oxidation treatment can remove the oxide layer on the surface of stainless steel. However, only formic acid can hardly dissolve iron oxide, and decontamination performance would be worse compared to the decontamination liquid of mixture of formic acid and oxalic acid.

When permanganic acid or permanganate is used as oxidizer, the ozonizer 10 and the mixer 9 shown in FIG. 1 can be eliminated.

Now the fourth test results are explained, which are featured in decomposition of hydrogen peroxide and ozone that are remained after decomposition of the decontamination liquid mixture of formic acid and oxalic acid. Although iron ions and radioactive material which have been dissolved into the decontamination liquid are separated by the ion exchange resins, deterioration of the ion exchange resins due to oxidation can be accelerated, if hydrogen peroxide and ozone are remained in the decontamination liquid. In order to suppress the deterioration, the decontamination liquid is irradiated with ultraviolet ray (hν), so that hydrogen peroxide and ozone are decomposed into water and oxygen as shown in Equations (4) and (5):

Decomposition of Hydrogen Peroxide:

$$H_2O_2+h\nu\rightarrow O_2+2H+^{+}2e^{-} \quad (4)$$

Decomposition of Ozone:

$$O_3+h\nu\rightarrow O+O_2 \quad (5)$$

Figure 3:
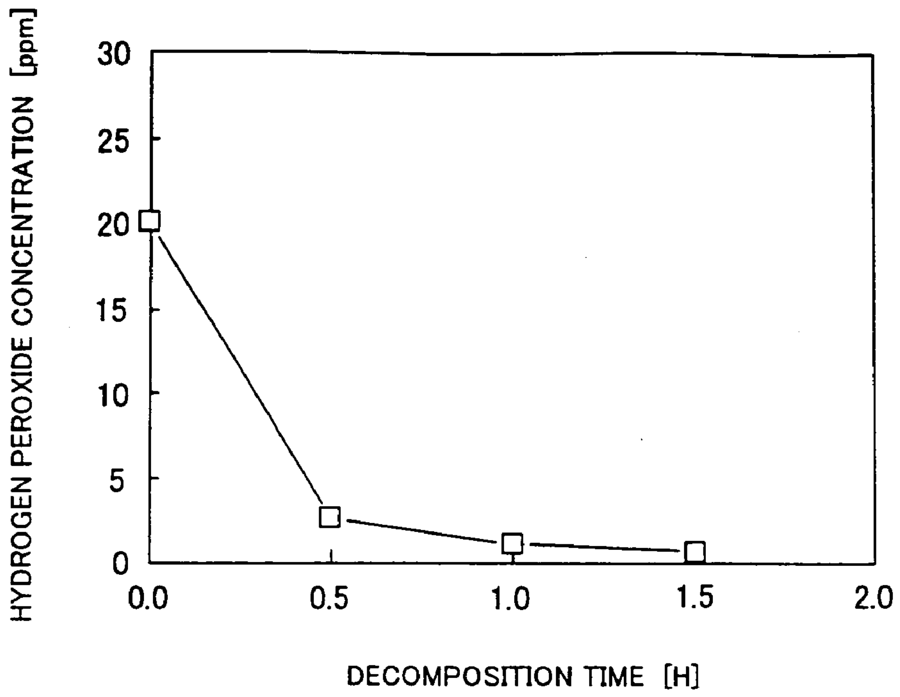
FIG. 3 is a curvature figure of decomposition test results of residual hydrogen peroxide, showing the effect of the first embodiment of the present invention.
Figure 4:
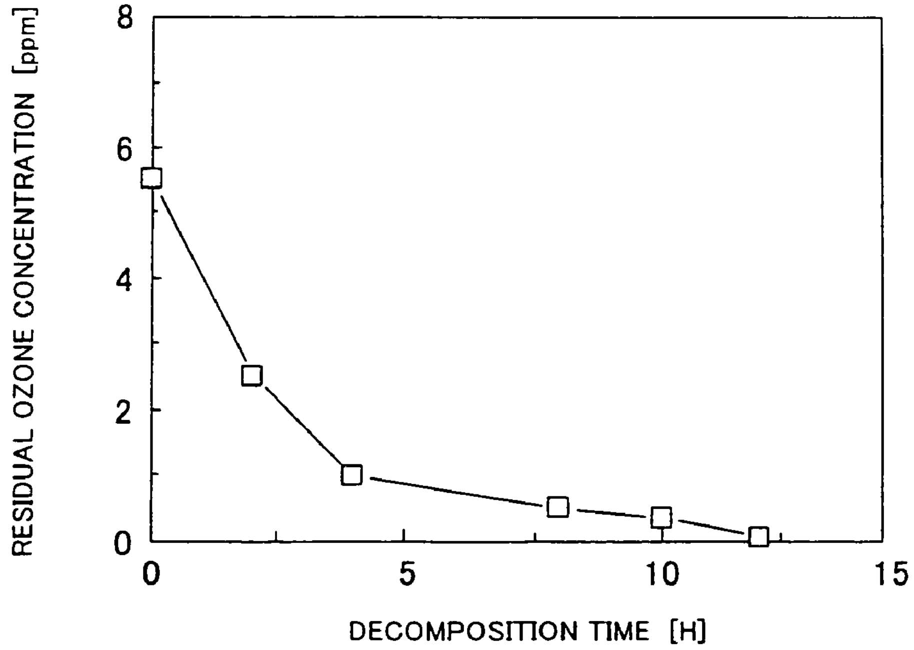
FIG. 4 is a curvature figure of decomposition test results of residual ozone, showing the effect of the first embodiment of the present invention.

In order to confirm the reaction described above, tests of decomposing hydrogen peroxide and ozone remained in the decontamination liquid (with formic acid concentration of 10 ppm or less) were conducted. The test results of hydrogen peroxide decomposition are shown in FIG. 3 and the test results of ozone decomposition are shown in FIG. 4. The ultraviolet ray output power was 3 kw/$m^3$. Hydrogen peroxide concentration decreased from the initial value of 20 ppm to 1 ppm in 1.5 hours, and ozone concentration decrease from the initial value of 5.5 ppm to 0.1 ppm in 12 minutes.

As discussed above, the hydrogen peroxide and ozone, which remain in the decontamination liquid during or after the decomposition of formic acid, can be decomposed by ultraviolet ray. Therefore, the dissolved metal ions can be separated without decreasing exchange capacity of the ion exchange resins. Thus, generation rate of spent ion exchange resins as secondary waste can be reduced.

The liquid-phase decomposer 6 for ultraviolet ray irradiation is used only to secure soundness of the ion exchange resins by decomposing the hydrogen peroxide and ozone which remain in the decontamination liquid. Therefore, if there are no hydrogen peroxide and ozone remained or if separation treatment of dissolved metal ions by the ion exchanger is omitted, the liquid-phase decomposer 6 can be eliminated.

It is known that addition of corrosion suppression agent is effective for suppressing corrosion of stainless steel which is in contact with oxidizer of ozone water. The corrosion suppression agent includes carbonic acid, carbonate, hydrogen carbonate, boric acid, borate, sulfuric acid, sulfate, phosphoric acid, phosphate and hydrogen phosphate. In the embodiment according to the present invention described above, the cited corrosion suppression agents have proved to be effective in suppressing corrosion of stainless steel base material during the oxalic acid decomposition process, because ozone gas is fed during the oxalic acid decomposition process.

According to the method and system for chemical decontamination of radioactive component of the present embodiment described above, oxide film including radioactive material generated or attached on the surface of radioactive component is chemically dissolved and decontaminated. The radioactive component to be decontaminated may be constructive part of a facility for handling radioactivity. In this method, the radioactive material is exposed alternately to reducing decontamination liquid of dissolved mixture of mono-carboxylic acid and dicarboxylic acid, and to oxidizing decontamination liquid dissolved with oxidizer. Thus, the radioactive material is effectively removed and decontaminated. The mono-carboxylic acid and di-carboxylic acid may be formic acid and oxalic acid, respectively, for example.

The $Fe^{3+}$ ions, which have eluted into the reducing mixture decontamination liquid, can be separated by the cation resins. Therefore, reducing device or reducing process for reducing $Fe^{3+}$ ions into $Fe^{2+}$ ions is not required, which results in cost reduction of the total decontamination system construction.

Furthermore, the formic acid in the reducing mixture decontamination liquid can be decomposed by only hydrogen peroxide, and the low concentration oxalic acid can be decomposed by oxidizing aqueous solution in a short time period. Therefore, reducing device or reducing process for generating bivalent iron can be eliminated, which results in further cost reduction of the total decontamination system construction.

Second Embodiment

A second embodiment of a method and a system for chemically decontaminating radioactive material according to the present invention are now described with reference to FIGS. 5 through 11. In this embodiment, not only the oxide layer on the surface of the radioactive component but also the base metal of the radioactive component may be dissolved.

Figure 5:
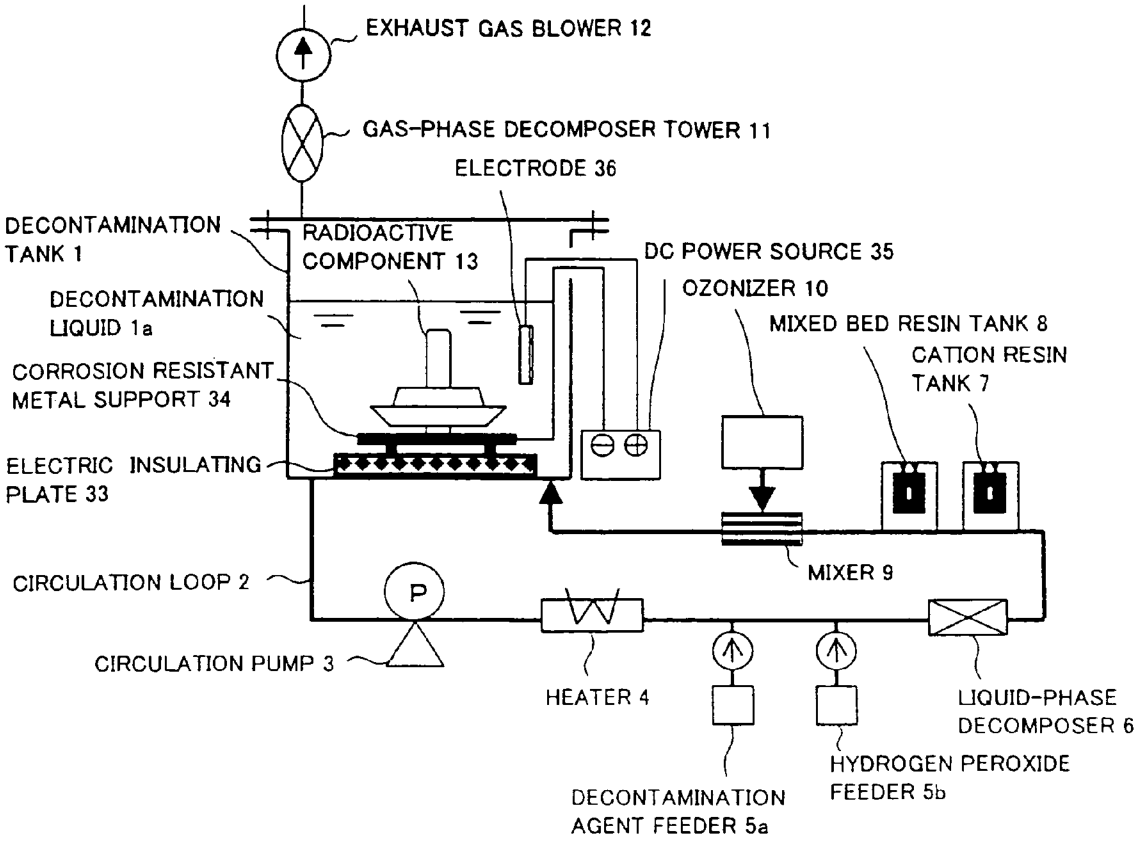
FIG. 5 is a flow diagram showing a second embodiment of the chemical decontamination system according to the present invention.

FIG. 5 shows the second embodiment of the system for chemically decontaminating radioactive material according to the present invention. This system is used for chemically decontaminating spent component which has been replaced by a spare component at a periodic inspection of a nuclear power station. The system includes a decontamination tank 1 for storing decontamination liquid 1*a*. The system also includes a circulation loop 2 which is connected to the decontamination tank 1 for circulating the decontamination liquid 1*a*. The circulation loop 2 includes a circulation pump 3, a heater 4, a decontamination agent feeder 5*a*, a hydrogen peroxide feeder 5*b*, a liquid-phase decomposer 6, a cation resin tank 7, a mixed bed resin tank 8, a mixer 9 and an ozonizer 10. The mixed bed resin tank 8 is filled with mixture of cation resins and anion resins.

The decontamination tank 1 is connected to an exhaust gas blower 12 via a gas-phase decomposer tower 11.

In this embodiment, an electric insulating plate 33 is disposed on the bottom of the decontamination tank 1, and a corrosion resistant metal support 34 is positioned on the electric insulating plate 33 in the tank 1. The radioactive component 13 is disposed on the corrosion resistant metal support 34. The cathode, of a direct current (DC) power source 35 is connected to the corrosion resistant metal support 34. The anode of the DC power source 35 is connected to an electrode 36, which is submerged in the decontamination liquid 1*a* in the decontamination tank 1.

Now, the sequence of the process for decontaminating radioactive component 13 made from stainless steel using the system shown in FIG. 5 is described. First, the decontamination tank 1 is filled with decontamination liquid 1*a*, which is demineralized water. The decontamination liquid 1*a* is circulated in the circulation loop 2 by the circulation pump 3, and is heated up to a stipulated temperature by the heater 4. The ozone water or the decontamination liquid 1*a* is generated by injecting ozone gas from the ozonizer 10 to the loop 2 via the mixer 9. The chromium oxide ($Cr_2O_3$) in the oxide film of the radioactive component (or the component to be decontaminated) 13 is dissolved by the oxidation effect of ozone into the decontamination liquid or the ozone water 1*a*. This reaction is shown in Equation (6):

$$Cr_2O_3+3O_3+2H_2O \rightarrow 2H_2CrO_4+3O_2 \qquad (6)$$

The ozone gas generated in the decontamination tank 1 is sucked by the exhaust gas blower 12. Then, the ozone gas is decomposed in the gas-phase decomposer tower 11 and is exhausted through existing exhaust system.

Now a method for dissolving the base metal of the radioactive component (or component to be decontaminated) 13. Formic acid and oxalic acid are injected from the decontamination agent feeder 5*a*, and decontamination liquid 1*a* of mixture of formic acid and oxalic acid is generated in the decontamination tank 1. The decontamination mixture 1*a* is driven by the circulation pump 3 to circulate through the circulation loop 2, and is heated up to a stipulated temperature by the heater 4. In this state, electric potential is provided between the corrosion resistant metal support 34 connected to the cathode of the DC power source 35 and the electrode 36 connected to the anode of the DC power source 35. Since the radioactive component 13 of stainless steel is in contact with the corrosion resistant metal support 34, the potential of the component 13 decreases to a corrosion region of stainless steel, and the base metal is dissolved to be decontaminated.

If the corrosion resistant metal support 34 were in electric contact with the decontamination tank 1, the decontamination tank 1 and the circulation loop 2, which is in contact with the circulation loop 2, would also be corroded due to lowered potential. In this embodiment, the decontamination tank 1 and the circulation loop 2 would not corrode, because the electric insulating plate 33 is disposed on the bottom of the decontamination tank 1.

Figure 6:
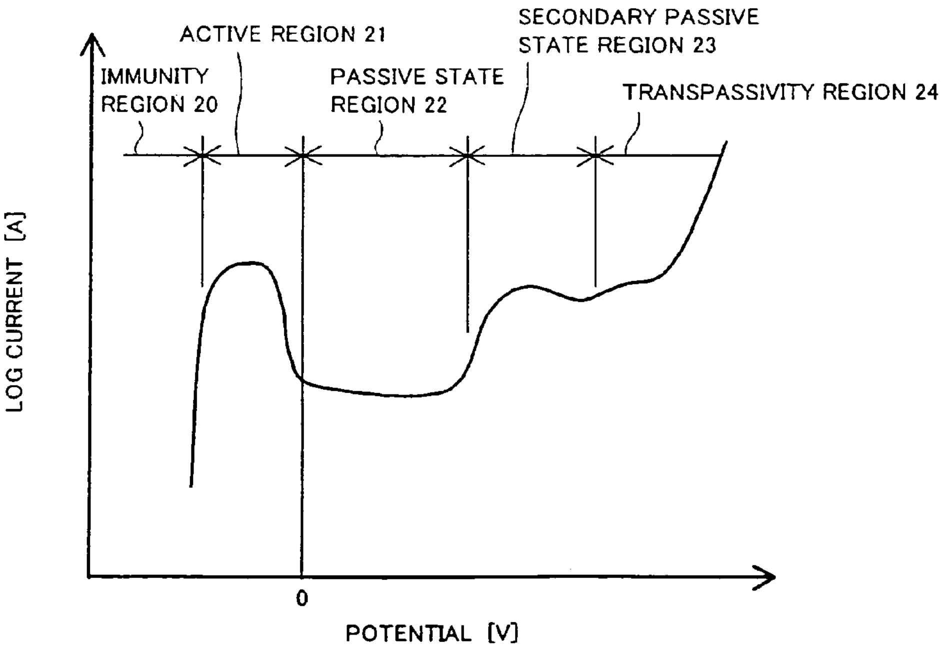
FIG. 6 is a polarization characteristics figure of corrosion potential of corrosion-resistant alloy showing the phenomena utilized by the second embodiment of the present invention.

FIG. 6 shows a polarization characteristic curve of stainless steel in acid. This polarization characteristic curve shows corrosion characteristics of metal material in a solution. The axis of ordinate is electric current in logarithmic scale, while the axis of abscissas is the potential. The polarization characteristic curve shows the current at the potential. A larger current corresponds to a larger corrosion elusion rate and a lower corrosion resistance.

As for high corrosion-resistant structural material such as stainless steel or nickel-base alloy, corrosion characteristics changes depending on the potential. The corrosion characteristic curve is divided into an immunity region 20, an active region 21, a passive state region 22, a secondary passive state region 23 and a transpassivity region 24.

In the immunity region 20 and the passive state region 22, corrosion rate is low because the current is small. On the other hand, in the active region 21 and the transpassivity region 24, corrosion rate is high because the current is large. In the transpassivity region 24, anode oxidation dissolution with generation of oxygen occurs. The transpassivity region 24 has been utilized in electrolysis decontamination for simple shaped components such as plates and pipes. In this embodiment according to the present invention, the corrosion potential of the stainless steel is lowered to the active region 21, and dissolution with generation of hydrogen is utilized.

If the iron ions eluted from the radioactive component 13 were accumulated in the mixture decontamination liquid 1*a*, the dissolution reaction of the base metal might be suppressed. Therefore, iron ions are removed by guiding the mixture decontamination liquid 1*a* through the cation resin tank 7.

After the decontamination process, hydrogen peroxide is fed through the hydrogen peroxide feeder 5*b* to the circulation loop 2, or ozone gas is injected from the ozonizer 10 through the mixer 9 to the circulation loop 2. Thus, the formic acid in the mixture decontamination liquid 1*a* is decomposed into carbon dioxide and water.

Figure 7:
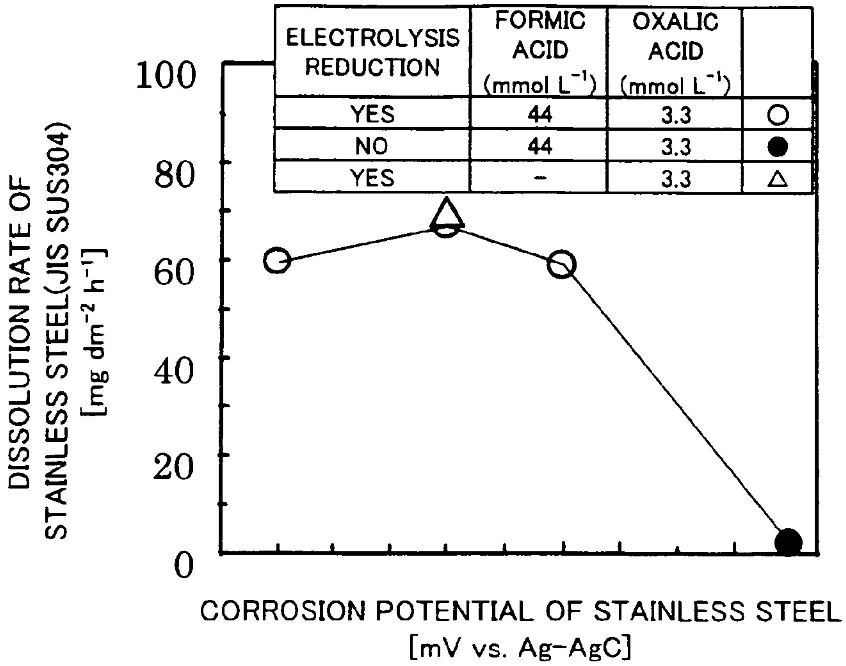
FIG. 7 is a curvature figure of dissolution of stainless steel base material, showing the effect of the second embodiment of the present invention.

FIG. 7 shows the results of tests of dissolving base material of stainless steel (JIS SUS 304) by the decontamination liquid of mixture of formic acid and oxalic acid. A test piece of stainless steel was connected to the cathode of the DC power source in the decontamination liquid of the mixture of formic acid and oxalic acid. The concentrations of formic acid and oxalic acid were 44 m mol $L^{-1}$ and 3.3 m mol $L^{-1}$, respectively. A potential was loaded between the test piece and the anode in the decontamination liquid.

As for the test conditions, the temperature of the mixture decontamination liquid was maintained a constant value of 95 degrees Centigrade, and the potential of the test piece was changed within the range of −1,000 to −500 mV as represented with blank circles (○) in FIG. 7. The ordinate axis is dissolution rate of the test piece, while the abscissa axis is potential of the test piece. FIG. 7 also shows other test results for comparison. One result represented with a solid circle (●) shows a result of a test without potential control, and another result represented with a blank triangle (Δ) shows result of a test with potential control in liquid of only oxalic acid aqueous solution with a concentration of 3.3 m mol $L^{-1}$.

Average dissolution rate of the test pieces in a potential range of −1,000 to −500 mV in the mixture decontamination liquid represented by "○" was 0.6 mg $cm^{-2}$ $h^{-1}$ which was equivalent to the case of only oxalic acid presented by "Δ". On the other hand, in the case of submergence in the mixture decontamination liquid without potential control represented by "●", there were almost no dissolution.

In the tests described above, the radioactive component 13 was connected to the cathode of the DC power source 35, and the potential of the component 13 was lowered to the corrosion region. The test results showed that the base material could be dissolved. The result means that the radioactive material which might have intruded in the base material of the radioactive component 13 would be removed.

Figure 8:
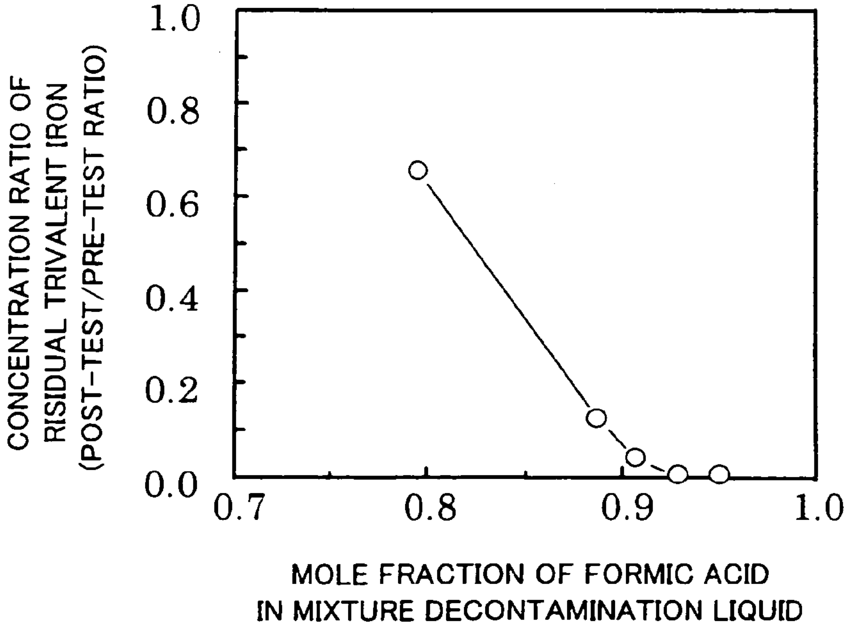
FIG. 8 is a curvature figure of separation of trivalent iron by cation resins, showing the effect of the second embodiment of the present invention.

FIG. 8 shows results of the tests where trivalent iron was separated with the cation exchange resins by changing mole fraction of formic acid in the mixture decontamination liquid. The ordinate axis is concentration ratio (post-test/pre-test ratio) of trivalent iron in the mixture decontamination liquid, while the abscissa axis is mole fraction of formic acid in the mixture decontamination liquid.

When the mole fraction of the formic acid was 0.93 or more, all of the trivalent iron was separated by the cation exchange resins. On the other hand, when the mole fraction was 0.91 or less, part of the trivalent iron remained, and the remained trivalent iron concentration increased substantially linearly with decrease of mole fraction.

When the decontamination liquid of only oxalic acid, which has been practically used as a chemical decontamination agent, is used, trivalent iron ions form complexes with oxalic acid. Therefore, the trivalent iron ions cannot be separated by a cation exchange resins. In order to separate the trivalent iron ions by a cation exchange resins, the trivalent iron must be reduced into bivalent iron by irradiating ultraviolet ray. When the decontamination mixture of formic acid and oxalic acid is used according to the present invention, the trivalent iron can also be decomposed. When the mol fraction of formic acid in the decontamination mixture liquid is 0.9 or more, almost all trivalent iron can be separated.

Thus, by using the decontamination liquid mixture of formic acid and oxalic acid according to the present invention, device and process for reducing trivalent iron can be eliminated. Therefore, decontamination treatment cost can be reduced compared to a case using decontamination liquid of only oxalic acid.

Figure 9:
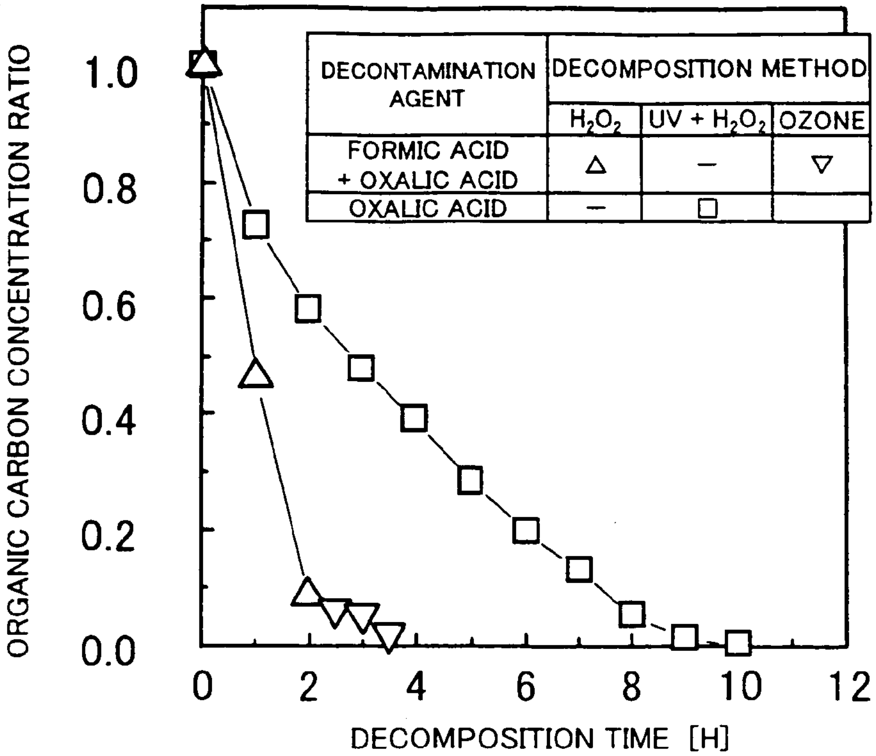
FIG. 9 is a curvature figure of decomposition of mixed decontamination liquid, showing the effect of the second embodiment of the present invention.

FIG. 9 shows the results of the tests of decomposing the decontamination mixture aqueous solution of formic acid and oxalic acid according to the present invention and prior-art aqueous solution of only oxalic acid. The tests included cases of aqueous solution of only oxalic acid of concentration of 22 m mol $L^{-1}$ which are represented by blank squares (□). The tests also included cases of mixture aqueous solution of formic acid of concentration of 44 m mol $L^{-1}$ and oxalic acid of concentration of 1.1 m mol $L^{-1}$, represented by blank triangles (Δ) and blank inverted triangles (∇) The temperature was 90 degrees Centigrade. Iron ions of 0.36 m mol $L^{-1}$ were dissolved in each aqueous solution.

As for decomposing, the formic acid was decomposed by the mixture aqueous solution with hydrogen peroxide (added amount: 1.5 times of equivalent) as shown by blank triangles (Δ), first. Then, the oxalic acid was decomposed by the ozone ($O_3$ generation rate/amount of liquid: 75 g/h/$m^3$) as shown by blank inverted triangles (∇). The aqueous solution of only oxalic acid was decomposed by combination of ultraviolet ray (output power/liquid volume: 3 kw/$m^3$) and hydrogen peroxide (added amount: 1.5 times of equivalent). The ordinate axis of FIG. 9 is ratio of organic carbon concentration to initial value.

As for the prior-art test results, the aqueous solution of only oxalic acid was decomposed to an organic carbon concentration of 0.8 m mol/$L^{-1}$ or less in 10 hours by the combination of hydrogen peroxide and ultraviolet ray.

As for the mixture aqueous solution of this embodiment according to the present invention, the formic acid was decomposed by only hydrogen peroxide, while the oxalic acid was not decomposed by only hydrogen peroxide. Then, after the formic acid was decomposed, the oxalic acid was decomposed by the ozone which was also used for oxidation, and the both acids were decomposed to an organic carbon concentration of 0.8 m mol $L^{-1}$ or less in less than 4 hours in total. Alternatively, the oxalic acid may be decomposed by other oxidizing aqueous solution such as permanganic acid or potassium permanganate.

The reason for not decomposing the formic acid by oxidizing aqueous solution was discussed before, in conjunction with the first embodiment.

The aqueous solution mixture of formic acid and oxalic acid requires about half time period compared to oxalic acid which has been practically used as decontamination agent. Although decomposition of oxalic acid requires a step for reducing trivalent iron to bivalent iron as explained as background art, decomposition of the aqueous solution mixture does not require a reducing step, which results in lower cost for total decontamination work.

Figure 10:
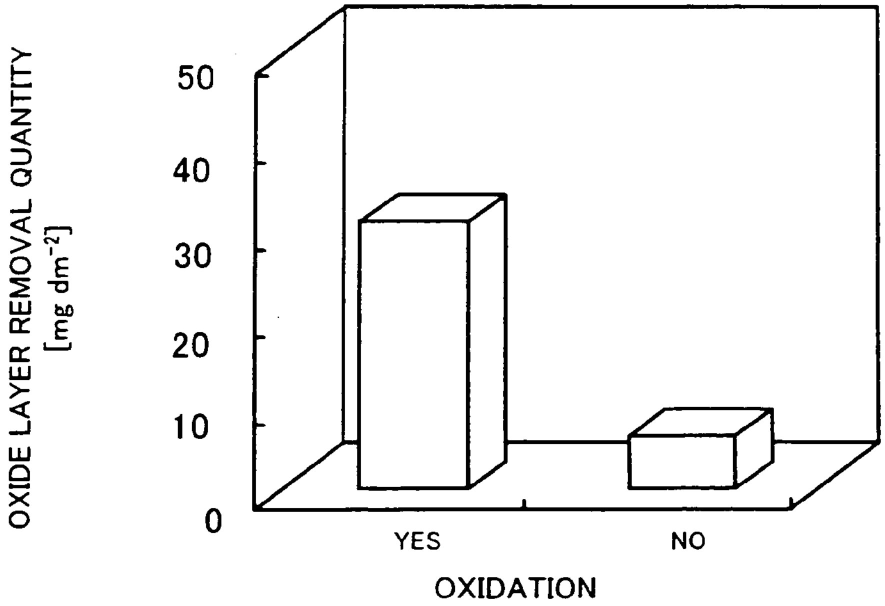
FIG. 10 is a graph of amount of removed stainless steel oxide film, showing the effect of the second embodiment of the present invention.

FIG. 10 shows results of the tests of dissolving stainless steel (JIS SUS 304) test pieces for confirming effect of removing oxide films formed on the surface of the components to be decontaminated. The test pieces had been provided with oxide surface film by soaking in hot water of 288 degrees Centigrade, simulating properties of the water in the primary system of a boiling water nuclear reactor, for 3,000 hours.

As for the test sequence, first, oxidation treatment was conducted by ozone water at a temperature of 80 degrees Centigrade with an ozone concentration of 5 ppm, and the duration time period was 2 hours.

Then, the base material was dissolved in the aqueous solution mixture of formic acid and oxalic acid with a potential control. The concentrations of formic acid and oxalic acid were 44 m mol $L^{-1}$ and 3.3 m mol $L^{-1}$, respectively—same as in the cases of FIG. 7. The temperature was 95 degrees Centigrade, and the duration time period was 1 hour. The potential was controlled at −500 mV vs Ag—AgCl.

FIG. 10 also shows the result of a test with aqueous solution mixture of formic acid and oxalic acid with a potential control without oxidation treatment. The concentrations of formic acid and oxalic acid, the temperature, the duration time period and the potential control were same as in the cases described above.

As shown in FIG. 10, the cases with oxidation by ozone water resulted in about three times larger weight reduction compared to the cases with only potential control or without oxidation. Most of the oxide film remained in the cases with only potential control, while most of the oxide film was removed in the cases with potential control and oxidation.

When the component to be decontaminated is made from stainless steel, main contents of the oxide film on the surface are iron oxide and chromium oxide, and most of the radioactive material is contained in the oxide film. Chromium oxide is dissolved by oxidizer such as ozone, while iron oxide is dissolved by reduction with organic acid such as formic acid and oxalic acid, as described later referring to FIG. 11. Therefore, it is to be understood from these test results that oxidation by ozone water is effective for removing radioactive material from the component to be decontaminated. Aqueous solution of permanganic acid or permanganate have effect similar to ozone water.

Figure 11:
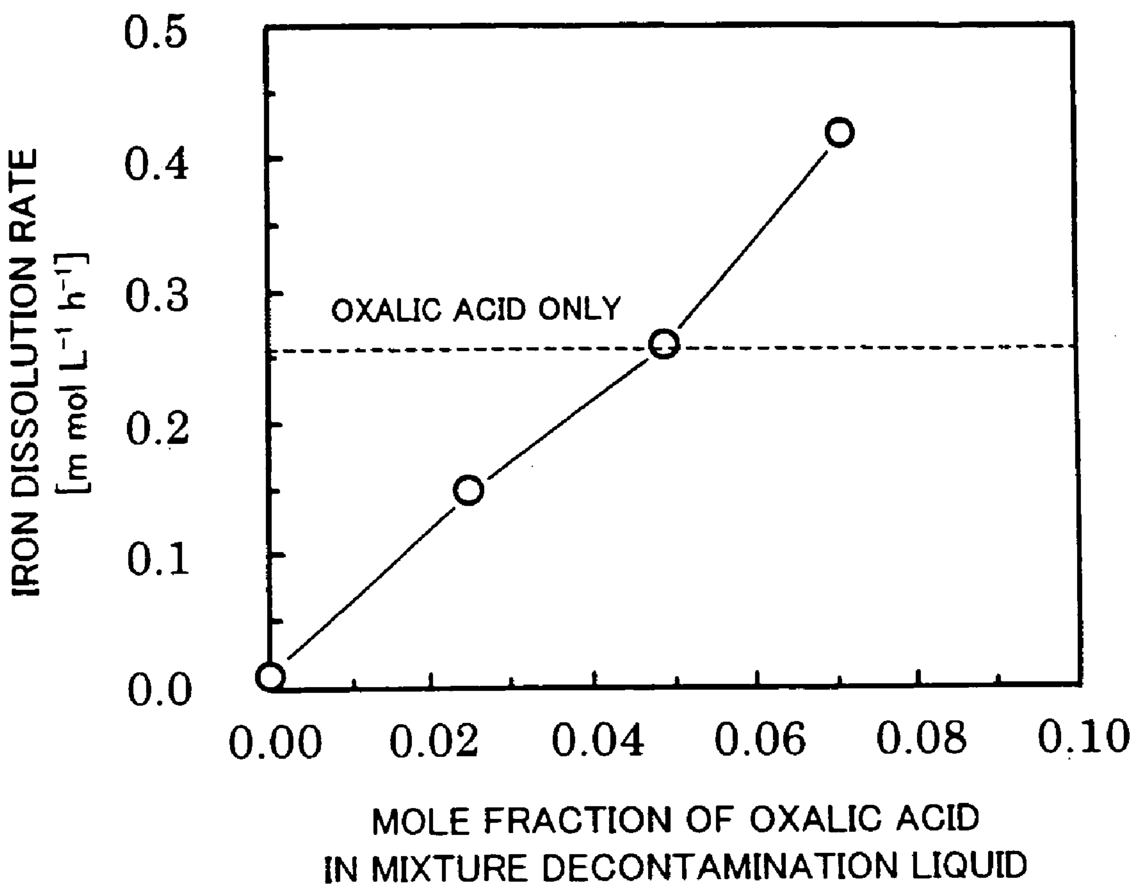
FIG. 11 is a curvature figure of dissolution of iron oxide (hematite), showing the effect of the second embodiment of the present invention.

FIG. 11 shows test results of measured dissolved iron concentration. Hematite ($Fe_2O_3$), which was used for simulating iron oxide in oxide film, was added into the mixture decontamination liquid at degrees Centigrade. The axis of ordinate is dissolution rate in m mol $L^{-1}$ $h^{-1}$, while the axis of abscissa is mole fraction of oxalic acid in the mixture decontamination liquid. When the mole fraction is zero, the decontamination liquid contains only formic acid. The horizontal dotted line in FIG. 11 shows the test results of measured dissolved iron concentration when decontamination liquid of only oxalic acid (concentration: 22 m mol/L) was used.

The test results showed, hematite was hardly dissolved by only formic acid, but it was dissolved by adding oxalic acid to formic acid. The dissolution rate increased substantially proportionally to the concentration of oxalic acid. When mole fraction of oxalic acid was 0.05 or more, the dissolution rate was over that of decontamination of only oxalic acid.

The test results showed that the mixture decontamination liquid can dissolve iron oxide which is the main component of oxide film. Since the dissolution rate of iron oxide heavily affects decontamination performance, the mixture decontamination liquid has a decontamination performance equivalent to or better than the prior-art decontamination liquid of only oxalic acid.

The above discussion is now summarized. Even aqueous solution of only formic acid or of only oxalic acid can dissolve base material, if the potential of the base material is lowered to the corrosion region of the stainless steel. However, in case of aqueous solution of only formic acid, the dissolution rate of base material is low, and iron oxide in the oxide film containing radioactive material is hardly dissolved. Since the bivalent iron and trivalent iron ions dissolved in aqueous solution of formic acid, which hardly form complexes with formic acid, can be easily separated by cation exchange resins.

On the other hand, in the cases of oxalic acid, which has been practically used as decontamination agent, the dissolution rate of base material is high, and the iron oxide is reduced and dissolved. However, since trivalent iron easily forms complexes with formic acid ions, trivalent iron cannot be separated by cation exchange resins.

According to this embodiment of the present invention, by using aqueous solution of mixture of formic acid and oxalic acid, merits of both acid are utilized, while demerits are compensated. By using the mixture decontamination liquid, dissolution rate of stainless steel base material increases, and trivalent iron can be separated. Especially, the separation performance of trivalent iron is enhanced when the mole fraction of formic acid in the mixture decontamination liquid is 0.9 or more. Thus, the device for reducing trivalent iron into bivalent iron can be eliminated which is required when only oxalic acid is used.

While formic acid can be decomposed by only hydrogen peroxide in a short time period, oxalic acid can hardly be decomposed by only hydrogen peroxide. Oxalic acid, which remains after formic acid is decomposed, is decomposed by ozone, hydrogen permanganic acid or potassium permanganate. Since the mole fraction of formic acid is 0.9 or more, the decomposition is conducted in a short time period.

When chromium oxide is contained in oxide film on the surface of the component to be decontaminated, the radioactive material in the oxide film can hardly removed, because chromium oxide is hardly dissolved by decontamination liquid mixture of formic acid and oxalic acid. In order to enhance decontamination performance, oxidation treatment using ozone, permanganic acid or permanganate is also utilized.

Chromium, which has been eluted from the oxide film, is dissolved in the decontamination liquid in a form of hexavalent chromium. Since hexavalent chromium is harmful, it must be made harmless through reduction into trivalent chromium. Formic acid is added to the decontamination liquid so that the pH of the liquid becomes 3 or less, and hexavalent chromium is reduced into trivalent chromium by hydrogen peroxide. Since formic acid can be easily decomposed into carbon dioxide and water by hydrogen peroxide, generation rate of secondary waste accompanied by reduction process can be drastically reduced.

Trivalent chromium, bivalent nickel, and bivalent and trivalent iron ions in the decontamination liquid are separated by cation exchange resins. If hydrogen peroxide or ozone is still in the decontamination liquid during the separation process, the ion exchange resins would be oxidized and deteriorate, which would result in decrease in exchange capacity of ion exchange resins and elution of component of the resins into the decontamination liquid. In order to evade such an incident, ultraviolet ray is irradiated on the decontamination liquid so that the hydrogen peroxide and ozone are decomposed.

According to this embodiment of the present invention, the radioactive component 13 of stainless steel in the decontamination liquid mixture 1*a* of formic acid and oxalic acid is connected to the cathode of the DC power source 35. Then, the potential of the radioactive component 13 is lowered to the corrosion region of stainless steel, so that the base metal is dissolved and decontaminated. Thus, corrosion of the decontamination device and resultant failures are prevented.

In addition, since the oxide film on the surface of the radioactive component 13 is dissolved and removed by combination with oxidation, dissolution of the base metal is accelerated, and the decontamination rate is enhanced.

Furthermore, the device and process for reducing trivalent iron can be eliminated by setting the mole fraction of the formic acid in the decontamination liquid mixture to 0.91 or more. Since the decomposition time period is drastically reduced, total cost for decontamination work is also drastically reduced.

Numerous modifications and variations of the present invention are possible in light of the above teachings. It is, therefore, to be understood that, within the scope of the appended claims, the present invention can be practiced in a manner other than as specifically described herein.

What is claimed is:

1. A system for chemically decontaminating radioactive material which forms a passage for liquid to flow through, the system comprising:

a circulation loop connected to the passage for circulating a decontamination liquid, the circulation loop comprising:

a decontamination agent feeder feeding the decontamination liquid that is reductive and that is an aqueous solution comprising a mono-carboxylic acid and a di-carboxylic acid to the decontamination liquid;

a hydrogen peroxide feeder feeding hydrogen peroxide to the decontamination liquid;

an ion exchanger for separating and removing metal ions in the decontamination liquid; and an ozonizer for injecting ozone into the decontamination liquid or an oxidizer feeder feeding permanganic acid or permanganate to the decontamination liquid;

wherein the system comprises only one circulation pump, and the only one circulation pump is comprised in the circulation loop;

wherein the mono-carboxylic acid is formic acid and the di-carboxylic acid is oxalic acid, wherein the mole fraction of the formic acid in the decontamination liquid is 0.9 or more, wherein the system does not contain a device for reducing trivalent iron atoms into bivalent iron atoms, and wherein any acid present in the system is an organic acid.

2. The system of claim 1, further comprising a radioactive material to be decontaminated, wherein the radioactive material is an oxide film comprising radioactive nuclides, and wherein the oxide film is adhered to a component.

3. The system of claim 2, wherein the oxide film is adhered to an internal surface of the component.

4. The system of claim 3, wherein the component is a constructional part.

5. The system of claim 2, wherein the component is a stainless steel component.

6. The system of claim 5, wherein the oxide film is an iron oxide film.

7. The system of claim 1, wherein relative to the direction of circulation of the decontamination liquid in the circulation loop, the pump is placed before the decontamination agent feeder.

8. The system of claim 1, wherein the circulation loop further comprises a heater.

9. The system of claim 8, wherein relative to the direction of circulation of the decontamination liquid in the circulation loop, the heater is placed before the decontamination agent feeder.

10. The system of claim 9, wherein, relative to the direction of circulation of the decontamination liquid in the circulation loop, the heater is placed before the decontamination agent feeder, and the pump is placed before the heater.

11. The system of claim 1, wherein the ion exchanger comprises a cation resin.

12. The system of claim 11, wherein the circulation loop further comprises a mixed bed resin tank.

13. The system of claim 12, wherein, the ion exchanger and the mixed bed resin tank are placed adjacent to each other in the circulation loop, and wherein, relative to the direction of circulation of the decontamination liquid in the circulation loop, the ion exchanger is placed before the mixed bed resin tank.

14. The system of claim 1, wherein the circulation loop further comprises a mixed bed resin tank.

15. The system of claim 1, wherein the circulation loop further comprises a heater and a mixed bed resin tank.

16. The system of claim 15, wherein the ion exchanger comprises a cation resin.

* * * * *